United States Patent [19]

Nagashima

[11] Patent Number: 4,791,308
[45] Date of Patent: Dec. 13, 1988

[54] SOLID-STATE IMAGE PICK-UP APPARATUS HAVING VARIABLE MAGNIFICATION OF IMAGE SIZES BY CHANGING THE IMAGE SENSOR ADDRESS RANGE

[75] Inventor: Yoshitake Nagashima, Chigasaki, Japan

[73] Assignee: Canon Kabushiki Kaisha, Tokyo, Japan

[21] Appl. No.: 919,186

[22] Filed: Oct. 15, 1986

[51] Int. Cl.$^4$ ............................................... H01J 40/14
[52] U.S. Cl. ................................. 250/578; 358/213.26
[58] Field of Search ........................... 250/211 J, 578; 358/213.13, 213.26, 213.27, 180, 293, 294; 357/24 LR, 24, 30 H; 377/60

[56] References Cited

U.S. PATENT DOCUMENTS

| | | | |
|---|---|---|---|
| 3,935,381 | 1/1976 | Petrocelli et al. | 358/180 |
| 4,002,824 | 1/1977 | Petrocelli et al. | 358/213.13 |
| 4,199,785 | 4/1980 | McCullough et al. | 358/180 |
| 4,426,664 | 1/1984 | Nagumo et al. | 358/213.26 |

Primary Examiner—David C. Nelms
Assistant Examiner—William L. Oen
Attorney, Agent, or Firm—Robin, Blecker & Daley

[57] ABSTRACT

A solid-state image pick-up apparatus for gradually reading out the data of picture elements residing within a range of addresses set according to a given clock signal is provided with means for making constant the read-out amount of the picture element data irrespective of the extent of the set address range, so that the image pick-up magnification is variable by changing the address range.

14 Claims, 3 Drawing Sheets i) ONE MAGNIFICATION MODE ii) 1/2 MAGNIFICATION MODE

SOLID-STATE IMAGE PICK-UP APPARATUS HAVING VARIABLE MAGNIFICATION OF IMAGE SIZES BY CHANGING THE IMAGE SENSOR ADDRESS RANGE

BACKGROUND OF THE INVENTION

1. Field of the Invention

This invention relates to a solid-state image pick-up apparatus and more particularly to a solid-state image pick-up apparatus arranged to have a variable image pick-up magnification.

2. Description of the Related Art

In changing the image pick-up magnification of an image pick-up apparatus, it has been practiced, for example, to change the magnification of an optical system as in the case of a zoom lens. This practice has resulted in the complex structural arrangement of the optical system and thus hindered efforts to reduce the size and weight of the apparatus. Meanwhile, there has been proposed a method of obtaining, for example, a zooming function by varying the read-out range of addresses of a solid-state image sensor as disclosed in Japanese Laid-Open Patent Application No. Sho 57-136872.

In the method of changing the read-out address range of a solid-state image sensor in obtaining, for example, a zooming function, the data of all the picture elements is read out in the case of a small image pick-up magnification while the data of only some of the picture elements is read out in the event of a large image pick-up magnification. With the range of read-out addresses thus arranged to vary with the image pick-up magnification, however, the amount of read-out picture element data varies. Therefore, in reading picture element data in a given cycle of the standard TV signal, a reading clock signal frequency must be changed accordingly as the image pick-up magnification varies. Then, the frequency band of an image signal obtained by such reading comes to be changed by the difference arising in the image pick-up magnification. This necessitates some change in the signal processing method to eliminate such inconvenience. The prior art method thus has presented a problem in terms of practicability.

SUMMARY OF THE INVENTION

It is a general object of this invention to solve the above-stated problems of the prior art.

It is a more specific object of this invention to provide a solid-state image pick-up apparatus of the kind gradually reading out the data of picture elements residing within a range of addresses set according to a given clock signal, wherein there is provided means for making the read-out amount of the picture element data constant irrespective of the extent of the set address range.

In the apparatus according to this invention, the frequency band of a read-out image signal remains unchanged with the frequency of a reading clock signal kept constant by fixing the amount of read-out picture element data to be unvarying even when the extent of a set address range changes; the image pick-up magnification can be changed with a simple structural arrangement; and the resolution of an image plane obtained by the apparatus is never deteriorated by changes in the image pick-up magnification.

The above and further objects and features of this invention will become apparent from the following detailed description of a preferred embodiment thereof taken in connection with the accompanying drawings.

DETAILED DESCRIPTION OF THE PREFERRED EMBODIMENTS

Figure 1:
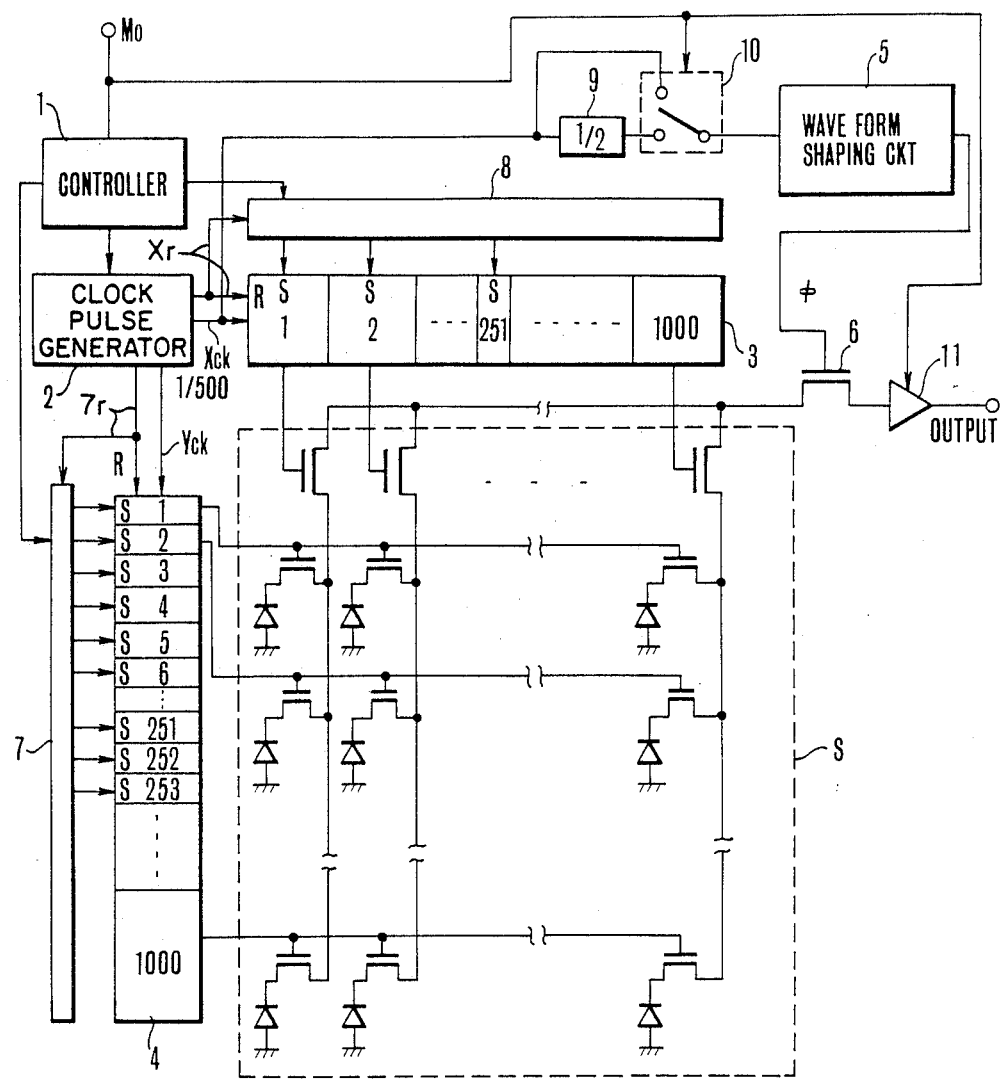
FIG. 1 is a block diagram showing a solid-state image pick-up apparatus arranged by way of example as an embodiment of this invention.

FIG. 1 shows in a block diagram a solid-state image pick-up apparatus arranged as an embodiment of this invention. An image sensor S which is, for example, composed of an MOS image sensor and static induction transistors (SIT), is arranged to permit reading out the signal of each picture element by addressing. The number of picture elements of the sensor S is, for example, 1000×1000. A mode input terminal Mo is arranged to receive a mode signal which indicates that the image pick-up magnification is one or ½ magnification. A controller 1 is arranged to send control signals to decoders 7 and 9 according to the signal from the input terminal Mo. A reference numeral 3 denotes a shift register arranged in the direction of X (hereinafter referred to as X-SR) and a numeral 4 a shift register arranged in the direction of Y (hereinafter referred to as Y-SR). Each of these shift registers 3 and 4 is arranged to set applicable bits thereof at "1" according to the output of the decoder 7 or 8. A clock pulse generator 2 is arranged to generate, in response to a signal from the controller 1, clock pulses Xck for driving the X-SR 3 or clock pulses Yck for driving the Y-SR 4. The frequency of the clock pulses applied to the X-SR 3 is, for example, 500 times as high as that of the clock pulses applied to the Y-SR 4. In this specific embodiment, the synchronizing pulse period, vertical blanking period, horizontal blanking period, etc. are not taken into consideration. However, these periods may be taken into consideration. When a signal is applied to its set terminal S, each of the X-SR 3 and Y-SR 4 stages produces at its output a "1". When a signal is applied to its reset terminal R, the stage output becomes "0" with the whole register reset. A wave form shaping circuit 5 is arranged to shape the wave form of a horizontal shift pulse signal Xck produced from the clock pulse generator 2 for driving the X-SR 3. By this shaping process the pulse width of the pulse signal to be applied to a reading gate 6 is made to be shorter than that of the signal Xck. The decoders 7 and 8 are arranged to switch signals to be applied to the set terminals S and to the reset terminals R of the X-SR 3 and Y-SR 4 from one over to the other according to signals produced from the controller 1.

In the case wherein the controller 1 sets the image pick-up magnification at ½ magnification, the shift registers at addresses 1 and 2 of the X-SR 3 are set at "1" while, of the shift registers of addresses 1 to 6 of the Y-SR 4, four of such shift registers are set at "1". More specifically, in the case of an odd number field, the shift registers at addresses 1 to 4 of the Y-SR 4 are set at "1". In the case of an even number field, the shift registers at addresses 3 to 6 of the Y-SR 4 are set at "1". Accordingly, in the case of the ½ image pick-up magnification, signals of four lines are simultaneously read out from two columns. Further, the combination of the read-out lines varies according as the field changes between odd-number and even-number fields.

Assuming that the image pick-up magnification is set at one magnification by the controller 1, the register at an address 251 of the X-SR 3 is set at "1" while two registers at two of the addresses from 251 to 253 of the Y-SR 4 are also set at "1". More specifically, the shift registers at addresses 251 and 252 of the Y-SR 4 are set at "1" in the case of an odd number field while the shift registers at addresses 252 and 253 are set at "1" in the case of an even number field. Accordingly, with the image pick-up magnification set at one magnification, signals of two lines and one column are simultaneously read out while the read-out combination varies according as the field changes between an odd number field and an even number field.

A ½ frequency divider 9 is arranged to produce incoming pulses by skipping one of every two pulses. A switching circuit 10 is arranged to selectively supply the wave form shaping circuit 5 either with a signal which is ½ frequency divided by the frequency divider 9 or a signal which is not frequency divided according to a signal coming from the mode signal input terminal Mo.

Figure 2:
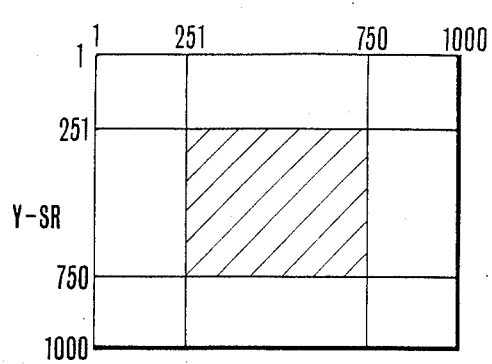
FIG. 2 is a plan view showing with hatching the position of picture elements read out when the apparatus is set at one magnification.

Further, when the image pick-up magnification is set at the magnification value of 1, the picture elements located in the area indicated by hatching in FIG. 2 is read out as mentioned in the foregoing. In the event of ½ image pick-up magnification, all the picture elements are read out. Further, the cycle in which the signal of the sensor S is read out remains constant irrespective of the image pick-up magnification. Therefore, the clock signals Xck and Yck which are arranged to drive the X-SR 3 and the Y-SR 4 must have, in the event of the ½ magnification, a frequency value two times as high as in the case of the one magnification.

However, in order to ensure that the frequency component (bandwidth) of the signal to be read out from the sensor is unvarying irrespective of the image pick-up magnification, the frequency at which the reading gate 6 is to be driven must be arranged to be unvarying. Therefore, in the case of this specific embodiment, the frequency divider 9 and the switching circuit 10 are arranged to keep unvarying the frequency at which the reading gate 6 is driven even when the clock signal Xck driving the X-SR 3 changes as a result of a change in the image pick-up magnification.

A variable gain amplifier 11 is arranged to amplify a signal produced via the gate 6. The amplifier 11 is provided with a sampling-and-holding function for holding a signal level over some period of time after the gate 6 opens until the gate again opens next time. The amplifier 11 is further arranged such that when the output level of the terminal Mo is low, the gain by the amplifier is reduced to ¼ of the gain obtained when the output of the terminal Mo is at a high level.

In this specific embodiment, when one field portion of signal is read out, a reset circuit which is not shown automatically reset the picture elements which have been skipped over.

Figure 3:
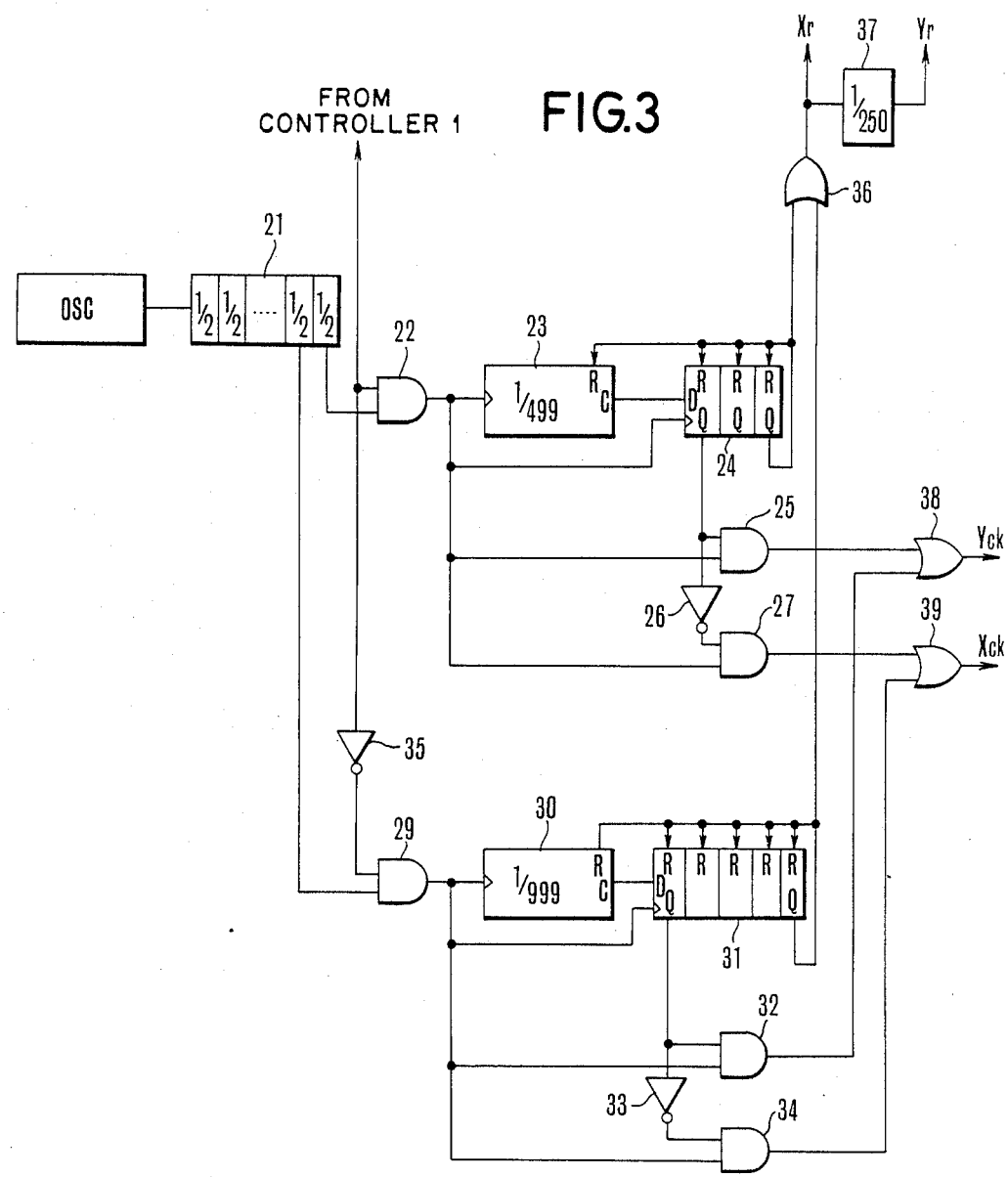
FIG. 3 is a block diagram showing the arrangement of a clock pulse generator 2 shown in FIG. 1.

Referring now to FIG. 3, the clock pulse generator 2 is arranged as follows: While horizontal and vertical synchronizing pulses are included in an actual application, they are omitted from the description given here which is limited to the operating principle. The illustration includes a reference clock pulse generator OSC. A frequency divider 21 has the output terminal of its final frequency dividing step connected to an AND gate 22 and that of dividing step lower by one step than the final step connected to another AND gate 29. A counter 23 is arranged to have its maximum count value at 499. The counter 23 is reset when a high level signal is applied to its reset terminal R and generates a high level signal from its carry terminal C when it overflows. A three-step shift register 24 has its terminal D connected to the carry terminal C of the counter 23. The clock pulse generator 2 is provided with AND gates 25 and 27 and an inverter 26. Another counter 30 is arranged to count up to 999. The counter 30 is reset when a high level signal is applied to its reset terminal R and produces a high level signal from its carry terminal C when it overflows. The carry terminal C of the counter 30 is connected to the terminal D of a five-step shift register 31. Reference numerals 32 and 34 denote AND gates and a numeral 33 an inverter. Another inverter 35 is arranged to invert a high level signal which comes to the terminal Mo indicating one image pick-up magnification and another high level signal which also comes to the terminal Mo indicating ½ magnification respectively. Numerals 36, 38 and 39 respectively denote OR gates. The OR gate 39 is arranged to produce a driving pulse Xck for driving the shift register (X-SR) 3. The OR gate 38 is arranged to produce a driving pulse Yck for driving the shift register (Y-SR) 4. The OR gate 36 is arranged to produce a reset pulse Xr for resetting the X-SR 3. A 1/250 frequency divider 37 is arranged to reset the Y-SR 4 by producing a reset pulse signal Yr every time the reset pulse signal Xr is produced 250 times.

Figure 4:
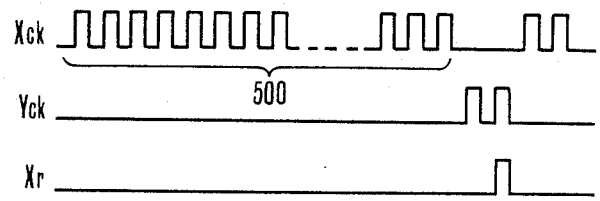
FIG. 4 is a wave form chart showing the operation of the embodiment shown in the block diagram in FIG. 1.
Figure 4:
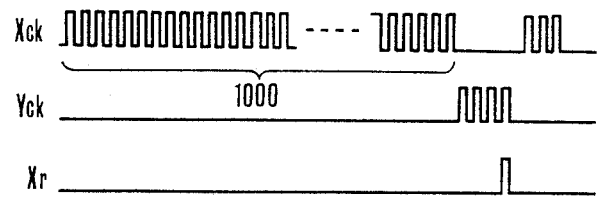
Figure 4:
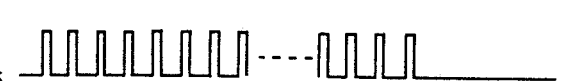

Referring to FIG. 4, the operation of the embodiment which is arranged as described above operates as follows: FIG. 4 shows driving wave forms. The operation will be described for two different modes. In one mode, the image pick-up magnification is set at one and, in the other, the magnification is set at ½.

(i) One magnification mode: In this mode, out of a total of 1000×1000 picture elements of the sensor S, data for 500×500 picture elements corresponding to the hatched part of FIG. 2 located at addresses 251 to 750 in the horizontal direction and addresses 251 to 750 in the vertical direction is read out in an interlacing manner.

In this instance, the controller 1 causes the decoder 8 to set at "1" the register at the address 251 of the X-SR 3. Then, in the case of an odd number field, the registers at addresses 251 and 252 of the Y-SR 4 are set at "1". In the case of an even number field, the registers at addresses 252 and 253 of the Y-SR 4 are set at "1". As a result, the data of picture elements located on the 251st and 252nd lines of FIG. 2 is simultaneously read out. Meanwhile, the switching circuit 10 is driven by the signal from the mode terminal Mo to produce the driving pulse signal Xck without passing it through the frequency divider 9 for driving the X-SR 3. Further, since a high level signal is supplied to the mode terminal Mo, the AND gate 29 closes (is disabled at its upper input) and the AND gate 22 opens (is enabled at its upper input). The counter 23 then counts 499 pulses coming via the AND gate 22. Upon completion of the count, the counter 23 produces a high level signal from its carry terminal C.

The next pulse passing through and gate 22 causes the first step Q output of the shift register 24 to change from a low level to a high level. Before this, since the first Q output of the shift register 24 was at the low level, the output of the frequency divider 21 was produced as the driving pulse signal Xck via the AND gate 27. However, when the number of pulses of the pulse signal Xck reaches 500 to cause the level of the first step Q output of the shift register 24 to become a high level, the output of the frequency divider 21 produces as the pulse signal Yck. Since the shift register 24 is arranged in three steps, one pulse of the reset pulse signal Xr is produced when the two pulses of the pulse signal Yck are produced. Accordingly, following this, the decoder 8 again set the register at the address 251 of the X-SR 3 at "1". Then, the registers at the addresses 253 and 254 of the Y-SR 4 are set at "1". The data for the picture elements on the 253rd and 254th lines is simultaneously read out from columns one after another.

After this reading process is repeated 250 times, that is, for 250 horizontal scanning lines, a reset pulse signal Yr is produced from a frequency divider 37. The Y-SR 4 is reset. The operation for a next field then begins. First, for interlacing, the decoder 7 is caused to set the registers at addresses 252 and 253 of the Y-SR 4 at "1". Then the picture element data is repeatedly read out in the same manner as described in the foregoing. Further, in this instance, the switching circuit 9 produces and supplies the pulse signal Xck for driving the X-SR 3 to the wave form shaping circuit 5 without passing it through the frequency divider 9. Therefore, the gate 6 produces a signal via the amplifier 11 for every picture element located in the horizontal direction.

(ii) ½ magnification: In the case of this mode, the data of all the 1000×1000 picture elements is read out by interlacing. In this specific embodiment, in order to make the number of picture elements for one frame or one field as in the case of the one magnification mode, data for two adjacent picture elements adjoining in the horizontal direction is simultaneously read out. Therefore, the controller 1 causes the decoder 8 to set at "1" the registers at the addresses 1 and 2 of the X-SR 3. Then, in the case of an odd number field, the registers at the addresses 1, 2 and 3 of the Y-SR are set at "1". In the case of an even number field, the registers at addresses 3, 4, 5 and 6 of the Y-SR 4 are set at "1". Therefore, for the first field, the data of the picture elements on the first to fourth lines of FIG. 2 are simultaneously read out from two columns at a time.

Further, in this instance, the driving pulse signal Xck for driving the X-SR 3 is at a frequency which is twice as high as that of the signal obtained in the case of one magnification mode. Therefore, the switching circuit 10 supplies the driving pulse signal Xck for driving the X-SR 3 via the frequency divider 9 to the wave form shaping circuit 5. Further, since a low level signal is supplied to the mode terminal Mo in this instance, the AND gate 29 opens and the AND gate 22 closes. Therefore, the counter 30 receives pulses at a frequency two times higher than the frequency obtained in the case of the one magnification mode. The counter 30 then counts 999 pulses coming via the AND gate 29 and then produces a high level signal at its carry terminal C.

At a next pulse, the first step Q output of the shift register 31 rises from a low level to a high level. Before that, the level of the first step Q output of the shift register 31 has been low and, therefore, the output of the frequency divider 21 has been produced via the AND gate 34 as the pulse signal Xck. However, when the number of pulses of the signal Xck reaches 1000 to change the level of the Q output from the low level to the high level, the output of the frequency divider 21 is produced as the pulse signal Yck. Since the shift register 31 is arranged to operate in five steps, when four pulses of the signal Yck are produced, one pulse of the reset pulse signal Xr is produced. Therefore, the decoder 8 again sets the registers of addresses 1 and 2 of the X-SR at "1". Then, during a next horizontal scanning process, the decoder 8 again sets the registers of addresses 5, 6, ∂and 8 of the Y-SR 4 at "1". As a result, the data of picture elements on the fifth and sixth lines of FIG. 2 is simultaneously read out from two columns at a time. With the reading process repeated 250 times, that is, for 250 horizontal scanning lines, the reset pulse signal Yr is produced from the frequency divider 37 to reset thereby the Y-SR 4. Then, signal reading begins for a next field. For interlacing, the decoder 7 first sets the registers of addresses 3, 4, 5 and 6 at "1" and the picture element data is read out in the same manner as described in the foregoing.

Further, in this instance, the switching circuit 10 supplies, via the frequency divider 9, the wave form shaping circuit 5 with the pulse signal Xck for driving the X-SR 3. Therefore, a signal which is obtained by adding up the data of two picture elements adjoining in the horizontal direction is produced from the amplifier 11 which performs a sampling-and-holding function. Such being the arrangement of this embodiment, the bandwidth of the image information signal thus read out is unvarying irrespective of the image pick-up magnification. Further, since the gain of the amplifier 11 obtained when the output level of the terminal Mo is low is arranged to be ¼ of the gain obtained when the output level of the terminal Mo is high, the arrangement prevents any unevenness between signals obtained in the one magnification mode and the ½ magnification mode, so that the quality of a reproduced picture can be prevented from degrading.

In the embodiment described, the initial setting addresses of the horizontal shift register (X-SR) 3 and the vertical shift register (Y-SR) 4 change in response to the signal from a terminal through which the image pick-up magnification is set. Then, the driving signal frequency of the reading gate 6 remains unchanged by virtue of the provision of the frequency divider 9 and the switching circuit 10 irrespective of any change that takes place in the frequency of the pulse signals for driving the two shift registers as a result of the change in the initial setting addresses. The frequency divider 9 and the switching circuit 10 are arranged such that the data of picture elements located within the hatched part of FIG. 2 is read out column by column in the case of the one image pick-up magnification and the data of all the picture elements shown in FIG. 2 read out from two columns by adding up the data of two columns at a time in the case of ½ magnification. With the reading density per unit area changed in this manner, the amount of picture element data read out per field period, that is, the reading density of information per unit time, is arranged to be unvarying irrespective of the change in the image pick-up magnification. However, this invention is not limited to such arrangement. In accordance with this invention, the amount of the picture element data or information to be read out can be arranged to be constant by reading out every other column of all the picture element data shown in FIG. 2 in the event of the ½ image pick-up magnification, instead of reading out the data of every two columns by adding up the data of two columns.

While, the image pick-up magnification is described as to be selectable between one magnification and ½ magnification in the foregoing description of the embodiment, this invention is of course not limited to these values of magnification.

What is claimed is:

1. An image pick-up apparatus comprising:
    (a) image pick-up means having a plurality of photoelectric converting elements arranged in a matrix, each of said elements generating an electrical signal indicative of information of such image;
    (b) read-out means for reading out said electrical signals by addressing said photoelectric converting elements, said read-out means being resspsonsive to respective diverse control signals to selectively read out different sizes of areas formed by said photoelectric converting elements within respective time periods of common duration; and
    (c) control means for generating said diverse control signals and for selectively combining said electrical signals in predetermined different combinations in correspondence with said size of areas of phoeoelectric converting elements addressed by said read-out means.

2. An apparatus according to claim 1, wherein said control means is operative to combine said electrical signals in such a manner as to keep unvarying the amount of such image information within each said period.

3. An apparatus according to claim 1, wherein said read-out means includes shift registers.

4. An apparatus according to claim 1, further comprising a gain control amplifier arranged to change the gain of said electrical signals read out by said read-out means in correspsondence with said size.

5. An image pick-up apparatus comprising:
    (a) image pick-up means for converting an optical image into electrical signals each indicative of a information of said image, said image pick-up means having a predetermined light receiving area;
    (b) reading means for reading out such signals from said image pick-up means; and
    (c) control means for controlling such signal readout by said reading means, said control means being changeable by operator input thereto between at least two operating modes including a first mode in which said reading means is caused to read out signals only from said image pick-up means within a first area of said predetermined light receiving area and a second mode in which said reading means is caused to read out signals from a second area which is larger than said first area, said control means being operative to change the read-out density of such signals read out from said image pick-up means respectively when operable in said first and second modes.

6. An apparatus according to claim 5, wherein said control means is operative to make the amount of such signals read out from said image pick-up means per unit time the same and unvarying irrespective of such mode of operation thereof.

7. An image pick-up apparatus, comprising:
    (a) impage pick-up means for converting an optical image into electrical signals;
    (b) first means for varying a range of read-out of electrical signals in said image pick-up means; and
    (c) control means for controlling gains of the read-out electrical signals in acordance with the variation of the read-out range by the first means.

8. An image pick-up apparatus according to claim 7, wherein said image pick-up means and control means are constituted jointly in a single semiconductor.

9. An image pick-up apparatus according to claim 7, further comprising means for making constant the amount of information read-out per unit time from the image pick-up means in accordance with the variation of the read-out range by said first means.

10. An image pick-up apparatus according to claim 9, wherein said image pick-up means includes picture elements arranged in a matrix and addressable to effect such signal read-out, and wherein said means for making such information amount constant varies the area in said matrix of addressing said picture elements in accordance with the variation of the read-out range by said first means.

11. An image pick-up apparatus, comprising:
    (a) impage pick-up means for converting an optical image into electrical signals;
    (b) first means for varying a range of read-out of electrical signals in said image pick-up means; and
    (c) means for making constant the amount of information read-out per unit time from the image pick-up means in accordance with the variation of the read-out range by said first means.

12. An image pick-up apparatus according to claim 11, wherein said image pick-up means includes picture elements arranged in a matrix and addressable to effect such signal read-out, and wherein said means for making such information amount constant varies the area in said matrix of addressing said picture elements in accordance with the variation of the read-out range by said first means.

13. An image pick-up apparatus according to claim 11, further comprising control means for controlling gains of read-out electrical signals in accordance with the variation of the read-out range by the first means.

14. An image pick-up apparatus according to claim 13, wherein said control means is formed in the same semiconductor as said pick-up means.

* * * * *

UNITED STATES PATENT AND TRADEMARK OFFICE
CERTIFICATE OF CORRECTION

PATENT NO. :   4,791,308
DATED      :   December 13, 1988
INVENTOR(S) :  Yoshitake Nagashima It is certified that error appears in the above-identified patent and that said Letters Patent is hereby corrected as shown below:

On the title page

Insert -- [30] Foreign Application Priority Date
        Oct. 18, 1985 [JP] Japan ... 60-233031 --

Col.3, line 61, change "reset" to -- resets --

Col.5, line 5, delete "as"

Col.5, line 10, change "set" to -- sets --

Col.6, line 7, change "∂" to -- 7 --

Col.7, line 12, change "respsonsive" to -- responsive --

Col.7, line 36, change "a" to -- an --

Signed and Sealed this

Twenty-third Day of May, 1989

Attest:

DONALD J. QUIGG

Attesting Officer

Commissioner of Patents and Trademarks